US011180097B2

(12) United States Patent
Masuda (10) Patent No.: US 11,180,097 B2
(45) Date of Patent: Nov. 23, 2021

(54) IN-VEHICLE POWER SUPPLY DEVICE

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventor: Kazuki Masuda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 17/058,216

(22) PCT Filed: May 14, 2019

(86) PCT No.: PCT/JP2019/019066
§ 371 (c)(1),
(2) Date: Nov. 24, 2020

(87) PCT Pub. No.: WO2019/225393
PCT Pub. Date: Nov. 28, 2019

(65) Prior Publication Data
US 2021/0178998 A1 Jun. 17, 2021

(30) Foreign Application Priority Data
May 24, 2018 (JP) .............................. JP2018-099740

(51) Int. Cl.
*H02J 1/10* (2006.01)
*H02J 3/00* (2006.01)
(Continued)

(52) U.S. Cl.
CPC ........... *B60R 16/033* (2013.01); *H02M 3/155* (2013.01)

(58) Field of Classification Search
CPC ...... H02J 1/102; H02J 3/36; H02J 1/10; H02J 1/08; H02J 3/382; H02J 7/1438;
(Continued)

(56) References Cited

U.S. PATENT DOCUMENTS

| 6,275,958 | B1 * | 8/2001 | Carpenter | H02J 1/102 |
| | | | | 714/48 |
| 8,970,068 | B2 * | 3/2015 | McCaslin | H02J 3/385 |
| | | | | 307/82 |

(Continued)

FOREIGN PATENT DOCUMENTS

| JP | 2017-22805 A | 1/2017 |
| JP | 2017-85810 A | 5/2017 |

OTHER PUBLICATIONS

International Search Report, Application No. PCT/JP2019/019066, dated Jul. 16, 2019. ISA/Japan Patent Office.

*Primary Examiner* — Quan Tra
(74) *Attorney, Agent, or Firm* — Honigman LLP (57) ABSTRACT

The present disclosure aims to reduce the changes that a control unit receiving power supplied from a power supply cannot perform control of a precharge operation even if the power supply voltage drops. In a power supply device, a reverse-flow prevention switching element is configured such that a plurality of semiconductor switching elements are connected in parallel with each other. The control unit, in accordance with a predetermined precharge condition being fulfilled, causes the second voltage conversion unit to perform the second voltage conversion operation by supplying a second control signal for switching to an ON signal and an OFF signal alternately to only some of the plurality (Continued)

of semiconductor switching elements constituting the reverse-flow prevention switching element.

11 Claims, 3 Drawing Sheets

(51) Int. Cl.
    *B60R 16/033*     (2006.01)
    *H02M 3/155*     (2006.01)

(58) Field of Classification Search
    CPC ... B60R 16/03; B60R 16/0315; B60R 21/017; Y02T 10/7005
    USPC .......................................... 307/10.1, 82, 85
    See application file for complete search history.

(56) References Cited

U.S. PATENT DOCUMENTS

| | | | |
|---|---|---|---|
| 10,148,184 B2* | 12/2018 | Abe | H02M 3/155 |
| 2003/0137786 A1* | 7/2003 | Hasegawa | H02H 9/001 |
| | | | 361/10 |
| 2006/0208714 A1 | 9/2006 | Saeki et al. | |
| 2007/0236287 A1* | 10/2007 | Bernacchia | H02M 3/1584 |
| | | | 330/10 |
| 2009/0103341 A1* | 4/2009 | Lee | B60L 53/24 |
| | | | 363/124 |
| 2016/0254749 A1* | 9/2016 | Kawakami | H02M 1/08 |
| | | | 323/271 |
| 2016/0260382 A1* | 9/2016 | Choi | H02M 3/158 |
| 2017/0264199 A1 | 9/2017 | Kimura et al. | |
| 2018/0301987 A1 | 10/2018 | Abe | |

\* cited by examiner

IN-VEHICLE POWER SUPPLY DEVICE

CROSS-REFERENCE TO RELATED APPLICATIONS

This application is the U.S. national stage of PCT/JP2019/019066 filed on May 14, 2019, which claims priority of Japanese Patent Application No. JP 2018-099740 filed on May 24, 2018, the contents of which are incorporated herein.

TECHNICAL FIELD

The present disclosure relates to an in-vehicle power supply device.

BACKGROUND

In vehicles provided with a rechargeable battery, when for example the ignition is turned off, the rechargeable battery is separated from any load connected to the battery and put into standby in some cases, in order to curb current consumption of the rechargeable battery. In this standby state, charges accumulated in capacitive components in this load are discharged, and the difference between a terminal voltage of the rechargeable battery and the voltage of the load increases. When the rechargeable battery is connected to this load in a state where the difference between the terminal voltage of the rechargeable battery and the voltage of the load is great, a large inrush current is generated between the rechargeable battery and the load.

A technique as disclosed in JP 2017-22805A has been proposed as a technique for solving this kind of problem. In the technique disclosed in JP 2017-22805A, before connecting the rechargeable battery and the load, by precharging a capacitive component in the load using a boost DC-DC converter, the generation of a large inrush current between the rechargeable battery and the load is curbed.

Incidentally, in order to perform precharge using a DC-DC convertor, a switching element that serves as a main element that performs a voltage conversion operation needs to be driven by a driver, and for this purpose, power needs to be supplied to the driver. On the other hand, in recent years, in order to reach the performance required for DC-DC converters, a configuration is used in which a plurality of switching elements are arranged in parallel, and the converters are connected in parallel to increase the number of phases. Due to such an increased parallelization, the current (drive current) that is output to the switching element and the like via the driver tends to increase. As a result of this, a more significant voltage drop tends to occur in resistive components, diode components, and the like, which are arranged in a path between the driver and a power supply that supplies power to the driver. Accordingly, if the power supply voltage (voltage of power supply for supplying power to the driver) drops, the voltage (threshold voltage) required for the operation of the driver may not be reached.

The present disclosure has been made in order to solve at least one of the above-described problems, and aims to realize an in-vehicle power supply device that can reduce the changes that a control unit receiving power supplied from a power supply cannot perform control of a precharge operation even if the power supply voltage drops.

SUMMARY

A first aspect of the present disclosure is an in-vehicle power supply device configured to lower a voltage applied to a first conductive path and apply the resultant voltage to a second conductive path, or boost a voltage applied to the second conductive path and apply the resultant voltage to the first conductive path. The in-vehicle power supply device is provided in an in-vehicle power supply system that is configured such that power from a first power supply unit is supplied via the first conductive path, power from a second power supply unit is supplied via the second conductive path, a capacitive component is electrically connected to the first conductive path, and a switch unit that switches between an ON state where a flow of current from the first power supply unit to the capacitive component side is allowed and an OFF state where that flow of current is interrupted is provided between the first power supply unit and the capacitive component. The in-vehicle power supply device includes a first voltage conversion unit that includes a first inductor and a drive switching element that is turned ON/OFF in accordance with a first control signal that is supplied to the drive switching element, and the first control signal alternately switching between an ON signal and an OFF signal. The first voltage control unit performs a first voltage conversion operation in which a voltage applied to the first conductive path is lowered by the ON/OFF operation of the drive switching unit and applied to the second conductive path. A reverse-flow prevention switching element is provided on the second conductive path and interrupts a flow of a current on the second conductive path toward the first voltage conversion unit when turned OFF. A second inductor is provided between the first voltage conversion unit and the reverse-flow prevention switching element on the second conductive path, and in series with respect to the reverse-flow prevention switching element. A semiconductor element part constituted by a diode or a switching element has one end electrically connected to the second inductor and the reverse-flow prevention switching element on the second conductive path and another end electrically connected to a reference conductive path. A control unit outputs the first control signal to at least the drive switching element, in which a second voltage conversion unit is configured by including the reverse-flow prevention switching element, the second inductor, and the semiconductor element part, and, when a part of the second conductive path that is on the first voltage conversion unit side of the second voltage conversion unit is regarded as an output-side conductive path, and a part of the second conductive path that is on the side opposite to the first voltage conversion unit side is regarded as an input-side conductive path, the second voltage conversion unit performs the second voltage conversion operation in which the voltage applied to the input-side conductive path is lowered, and an output voltage is applied to the output-side conductive path, the reverse-flow prevention switching element is configured such that a plurality of semiconductor switching elements are connected in parallel with each other. The control unit causes the second voltage conversion unit to perform the second voltage conversion operation by supplying a second control signal by which an ON signal and OFF signal are alternately switched to only some of the plurality of semiconductor switching elements constituting the reverse-flow prevention switching element in accordance with a predetermined precharge condition being fulfilled.

Advantageous Effects of Disclosure

According to an in-vehicle power supply device according to the first aspect, since the second voltage conversion unit can be caused to perform the second voltage converting operation in accordance with a predetermined precharge condition being fulfilled, if the switch unit is switched from the OFF state to the ON state at least after the second voltage conversion operation is performed in this manner, the switch unit is switched from the OFF state to the ON state in a state where charging of the capacitive component progresses to some extent. Accordingly, it is possible to suppress an inrush current that flows into the capacitive component from the first power supply unit immediately after the switching.

In addition, due to the configuration, in which the second control signal is supplied to only some of the plurality of semiconductor switching elements constituting the reverse-flow prevention switching element in a case where the control unit causes the second voltage conversion unit to perform the second voltage converting operation in accordance with a predetermined precharge condition being fulfilled, it is possible to suppress the power that is required for the control unit to drive the reverse-flow prevention switching element along with the second voltage conversion operation. Accordingly, even if the voltage of the power supply that supplies power to the control unit drops, a situation where the control unit cannot perform control of the precharge operation (control of the second voltage converting operation) is not likely to occur.

DETAILED DESCRIPTION OF PREFERRED EMBODIMENTS

The in-vehicle power supply device according to the present disclosure may also include a plurality of third conductive paths that serve as a power supply path from the second conductive path to the control unit. The plurality of third conductive paths may also be connected in parallel with each other between the second conductive path and the control unit, and a voltage generation unit that boosts a voltage applied to the conductive path on the second conductive path side and applies the output voltage to the conductive path on the control unit side may also be provided on one of the third conductive paths.

According to this configuration, even if the voltage applied to the second conductive path is small, the voltage generation unit can boost the voltage applied to the conductive path on the second conductive path side and apply the output voltage to the conductive path on the control unit side. Accordingly, even if the voltage applied to the second conductive path is small, the drive voltage required for the operation of the control unit is readily ensured.

The control unit, in accordance with the predetermined precharge condition being fulfilled, may also supply the second control signal to only one of the plurality of semiconductor switching elements constituting the reverse-flow prevention switching element, and cause the second voltage conversion unit to perform a second voltage conversion operation.

With this configuration, since the number of the driving semiconductor switching elements can be minimized when performing the second voltage conversion operation, power consumption during the second voltage conversion operation can be further reduced.

Furthermore, in the power supply device according to the present disclosure, the semiconductor element part may also be a switching element.

With this configuration, by turning the switching element ON, for example, an inverse current (hereinafter also referred to as "reverse current") generated in the second inductor or the first inductor when a current smaller than a critical current of the second inductor and the first inductor flow can be caused to flow into the reference conductive path without being accumulated in the switching element. In this manner, when performing the second voltage conversion operation, since the reverse current is prevented from adding to the output from the reverse-flow prevention switching element, it is possible to reduce the changes that the width (duty ratio) of the output of the reverse-flow prevention switching element unintentionally changes due to the reverse current.

Furthermore, in the power supply device according to the present disclosure, the control unit may also turn ON the drive switching element in the period in which the control unit causes the second voltage conversion unit to perform the second voltage conversion operation. In this manner, it is possible to further suppress a voltage drop that occurs in the drive switching element during the second voltage conversion operation.

For example, it is conceivable to use a method in which an FET is used as the drive switching element and turn OFF the FET during the second voltage conversion operation and a current is caused to flow from the second conductive path side toward the first conductive path using only a body diode of the FET as the energizing path. However, in this method, there is concern about a loss in the body diode. However, if the drive switching element is turned ON in the period in which the second voltage conversion unit is caused to perform the second voltage conversion operation, such a loss can be reliably avoided.

First Embodiment

The following describes a first embodiment, which is a specific example of the present disclosure.

Figure 1:
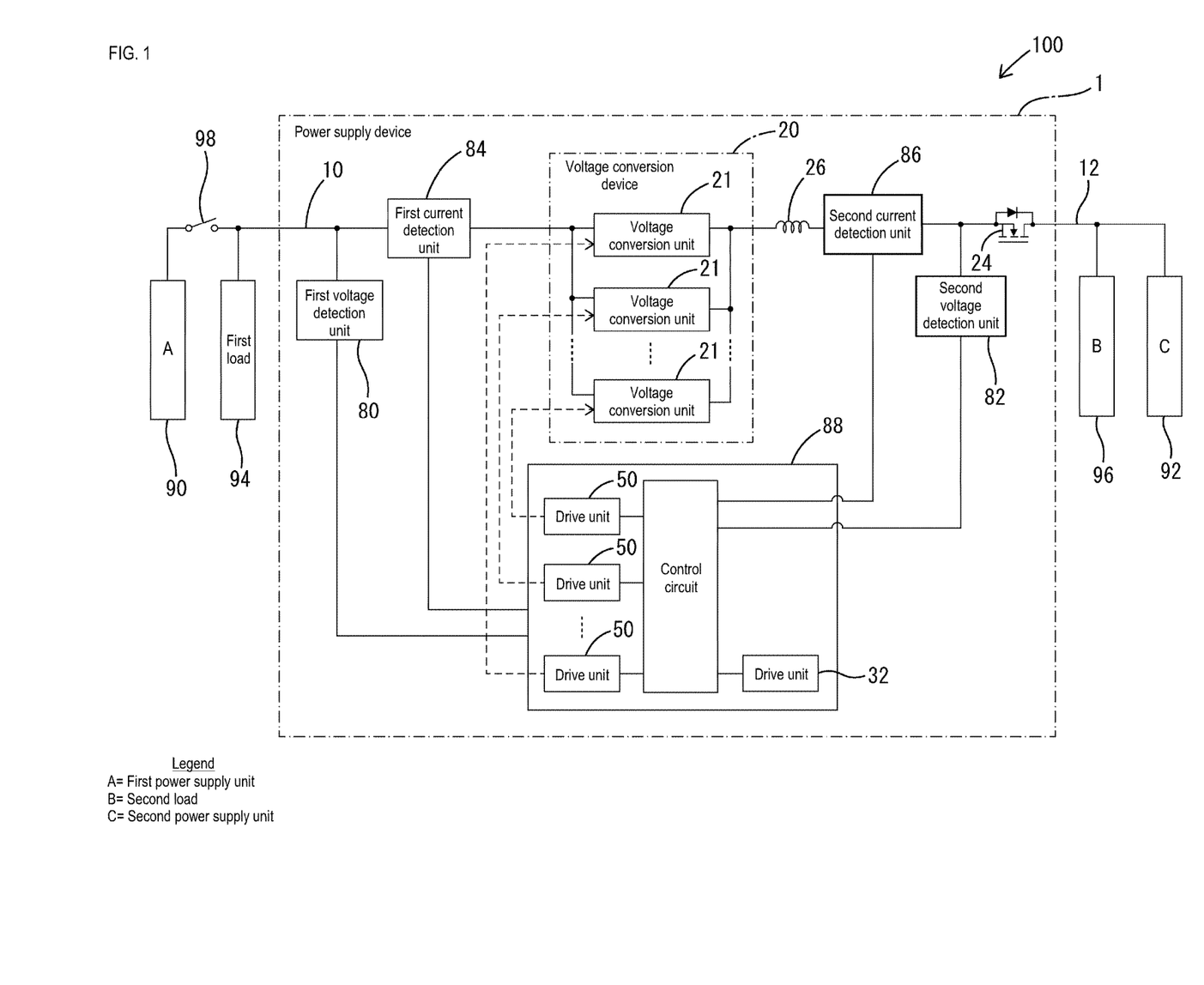
FIG. 1 is a block diagram schematically illustrating a configuration of an in-vehicle power supply system including an in-vehicle power supply device of a first embodiment.

An in-vehicle power supply device 1 (hereinafter also referred to as "power supply device 1") of the first embodiment is a part of an in-vehicle power supply system 100 (hereinafter also referred to as "power supply system 100") shown in FIG. 1. The power supply system 100 includes a first power supply unit 90, a second power supply unit 92, a first load 94, a second load 96, and a power supply device 1, for example. The power supply system 100 is configured as a system that can supply power to the first load 94 using the first power supply unit 90 as the power supply source, and charge (precharge) a capacitive component of the first load 94 that has discharged when turning OFF an ignition switch or the like via the power supply device 1, using the second power supply unit 92 as the power supply source.

The first power supply unit 90 is a part that can supply power to the first load 94 or the second load 96, and is configured as a known in-vehicle battery such as a lithium ion battery. In the first power supply unit 90, a high-potential terminal is electrically connected to the first conductive path 10 and a low-potential terminal is electrically connected to a reference conductive path (ground part, not shown), and a predetermined output voltage is applied to the first conductive path 10. When the switch unit 98 provided on the first conductive path 10 is switched from an OFF state to an ON state, the first power supply unit 90 is electrically connected to the first load 94 and the power supply device 1 via the first conductive path 10.

The second power supply unit 92 is a part that can supply power to the first load 94 or the second load 96, and is configured as a known in-vehicle battery such as a lead battery. In the second power supply unit 92, a high-potential terminal is electrically connected to the second conductive path 12 and a low-potential terminal is electrically connected to the ground part (not shown), and a predetermined output voltage is applied to the second conductive path 12. The second power supply unit 92 is electrically connected to the second load 96 and the power supply device 1 via the second conductive path 12.

The first load 94 includes a capacitive component, and this capacitive component corresponds to an example of the capacitive component of the present disclosure. The first load 94 is electrically connected to the first conductive path 10, and is connected to the power supply device 1 via the first conductive path 10. The capacitive component may be a capacitor or the like, or any other capacitive component.

The second load 96 includes a capacitive component. The second load 96 is electrically connected to the second conductive path 12, and is connected to the power supply device 1 via the second conductive path 12.

The power supply device 1 is configured as a device that can lower a voltage applied to the first conductive path 10 and apply the resultant voltage to the second conductive path 12, and also boost or lower a voltage applied to the second conductive path 12 and apply the resultant voltage to the first conductive path 10. The power supply device 1 includes a first voltage detection unit 80, a first current detection unit 84, a second voltage detection unit 82, a second current detection unit 86, a voltage conversion device 20, and a control unit 88, for example.

The first voltage detection unit 80 is configured as a known voltage detector, for example, and detects and outputs the voltage of the first conductive path 10. Specifically, the first voltage detection unit 80 detects the voltage output from the power supply device 1 to the first load 94 and outputs a value reflecting the detected (output) voltage (e.g., the exact value or a voltage-divided value of the voltage of the first conductive path 10) as the detected value.

The first current detection unit 84 is configured as a known current detector, for example, and detects and outputs the current output from the power supply device 1 to the first load 94. Specifically, the first current detection unit 84 includes a resistor that is arranged on the first conductive path 10, and a differential amplifier. The voltage between the two ends of the resistor is input to the differential amplifier, the voltage drop generated in the resistor due to the current flowing through the first conductive path 10 is amplified by the differential amplifier, and the resultant value is output as the detected value.

The second voltage detection unit 82 is configured as a known voltage detector, for example, and detects and outputs the voltage of the second conductive path 12. Specifically, the second voltage detection unit 82 detects a voltage output from the power supply device 1 to the second load 96 and outputs the value reflecting the detected (output) voltage (e.g., the exact value or a voltage-divided value of the voltage of the second conductive path 12) as the detected value.

The second current detection unit 86 is configured as a known current detector, for example, and detects and outputs the current flowing through the second conductive path 12. Specifically, the second current detection unit 86 includes a resistor that is arranged on the second conductive path 12, and a differential amplifier. The voltage between the two ends of the resistor is input to the differential amplifier, the voltage drop generated in the resistor due to the current flowing through the second conductive path 12 is amplified by the differential amplifier, and the resultant value is output as the detected value.

The voltage conversion device 20 includes a plurality of first voltage conversion units 21 provided in parallel with each other, and is configured as a multiphase DC-DC convertor. In the voltage conversion device 20, one end is electrically connected to the first conductive path 10, and the other end is electrically connected to the second conductive path 12. The voltage conversion device 20 can lower the voltage applied to the first conductive path 10 and apply the resultant voltage to the second conductive path 12, and can boost the voltage applied to the second conductive path 12 and apply the resultant voltage to the first conductive path 10.

The control unit 88 is a part that controls the operation of the voltage conversion device 20, and is constituted by mainly including a control circuit, first drive units 50, and a second drive unit 32. In the control unit 88, the control circuit is configured as a microcomputer, for example, and includes a computation device such as a CPU, a memory such as a ROM or a RAM, an AD convertor, and the like. Power is supplied to the control unit 88 from the first power supply unit 90 or the second power supply unit 92.

The control unit 88 is electrically connected to the first voltage detection unit 80, the second voltage detection unit 82, the first current detection unit 84, and the second current detection unit 86, and can obtain the detected values of these detection units. The control unit 88 has a function of determining a duty ratio based on the obtained detected value, and generating and outputting a PWM signal with the determined duty ratio. The control unit 88 can control the plurality of first voltage conversion units 21 individually by generating a PWM signal SG1 and outputting the PWM signal SG1 to the first drive units 50 provided in each of the first voltage conversion units 21. In this manner, the control unit 88 can perform control such that the first voltage conversion units 21 (voltage conversion device 20) boost or lower the voltage.

Figure 2:
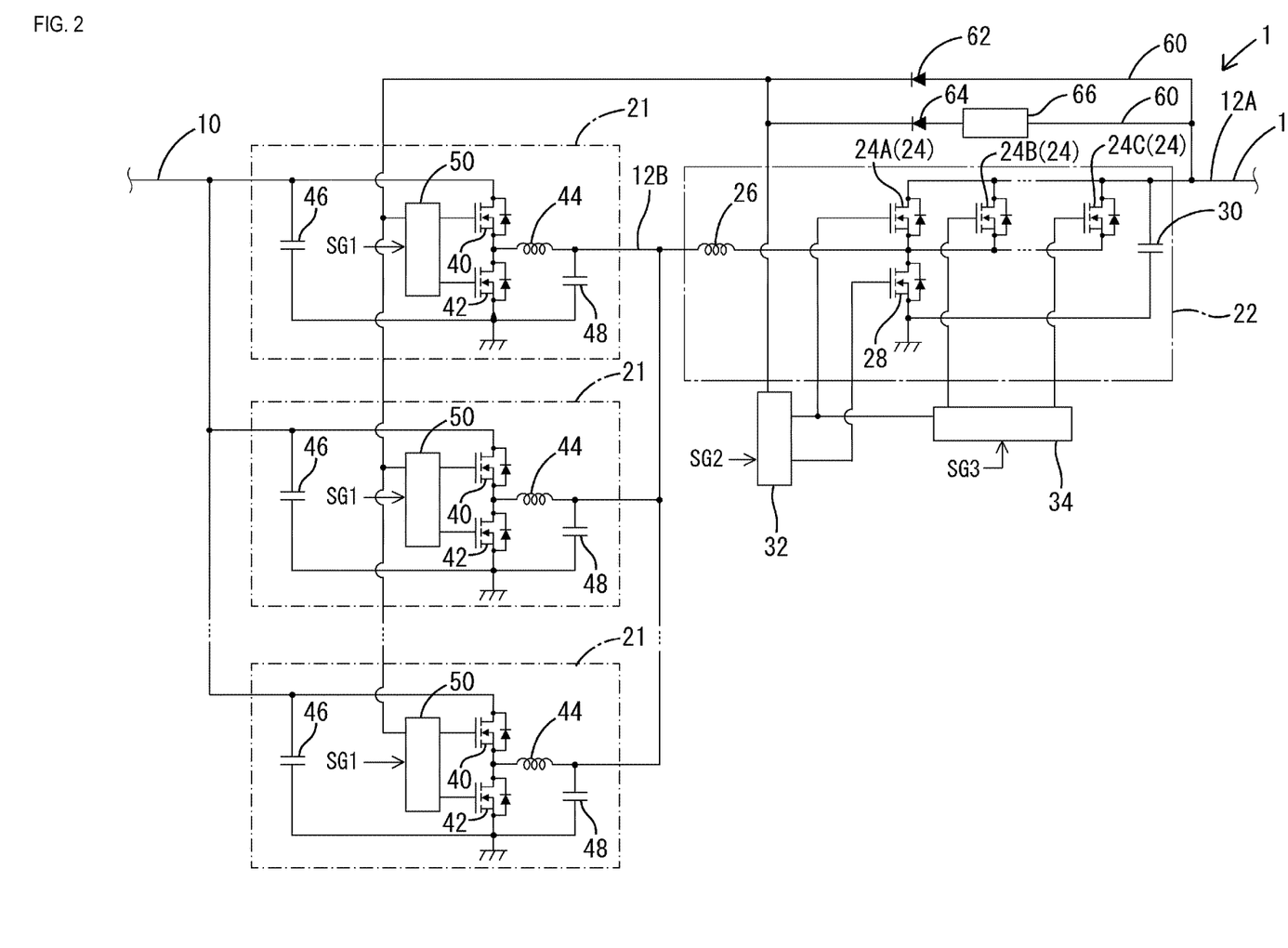
FIG. 2 is a block diagram specifically illustrating a configuration of a voltage conversion device included in the in-vehicle power supply device.

As shown in FIG. 2, the power supply device 1 includes the plurality of first voltage conversion units 21, a plurality of reverse-flow prevention switching elements 24, a second inductor 26, a switching element 28, a capacitor 30, the second drive unit 32, and a signal generation circuit 34, for example.

The plurality (all) of first voltage conversion units 21 are provided in parallel with each other. The first voltage conversion units 21 are each configured as a synchronous rectification-type step up/down DC-DC convertor, and can perform a first voltage conversion operation in which the voltage applied to the first conductive path 10 is lowered and the resultant voltage is applied to the second conductive path 12. Furthermore, one end of each first voltage conversion unit 21 is electrically connected to the first conductive path 10, and the other end is electrically connected to the second conductive path 12.

The first voltage conversion units 21 are each provided with a high-side switching element 40, a low-side switching element 42, and a first inductor 44. The switching element 40 is configured as an N-channel MOSFET, and the first conductive path 10 is electrically connected to the drain of the switching element 40, and the drain of the switching element 42 and one end of the first inductor 44 are connected to the source thereof. The drain of the switching element 42 is connected to the connection point of the switching element 40 and the first inductor 44. The source of the switching element 42 is electrically connected to the reference conductive path. Note that the switching element 40 corresponds to an example of the drive switching element.

The first voltage conversion units 21 each have a high-side capacitor 46 and a low-side capacitor 48. One end of the capacitor 46 is connected to the first conductive path 10, and the other end is electrically connected to the reference conductive path. One end of the capacitor 48 is connected to the second conductive path 12, and connected to the other end of the first inductor 44 and one end of the second inductor 26 via the second conductive path 12. The other end of the capacitor 48 is electrically connected to the reference conductive path.

The plurality of first drive units 50 are respectively provided to the plurality of first voltage conversion units 21. The first drive units 50 correspond to an example of the drive unit, and apply, to the gate of the switching elements 40 and 42, an ON signal (PWM signal) for alternately turning ON the switching elements 40 and 42, based on the PWM signal SG1 generated by the control unit 88. Note that the PWM signal that is output to the switching elements 40 and 42 by the first drive unit 50 corresponds to an example of a control signal. Hereinafter, the PWM signal that is output to the switching elements 40 and 42 by the first drive unit 50 is also referred to as "control signal".

The plurality (all) of reverse-flow prevention switching elements 24 are arranged such that a plurality of semiconductor switching elements 24A, 24B, 24C, . . . and so on are connected in parallel with each other. The reverse-flow prevention switching elements 24 have a function of interrupting a current flowing into the first voltage conversion units 21 on the second conductive path 12 when all the semiconductor switching elements 24A, 24B, 24C, . . . and so on are turned OFF. Specifically, the plurality of semiconductor switching elements 24A, 24B, 24C, . . . and so on are each configured as an N-channel MOSFET, and the drains thereof are electrically connected to the conductive path of the second conductive path 12 on the second power supply unit 92 side, and the sources thereof are electrically connected to the conductive path of the second conductive path 12 on the first voltage conversion unit 21 side.

The second inductor 26 is provided between the first voltage conversion unit 21 and the reverse-flow prevention switching elements 24 on the second conductive path 12, and provided in series with the reverse-flow prevention switching elements 24. Specifically, one end of the second inductor 26 is electrically connected to the connection points of the first inductors 44 and the capacitors 48 of the first voltage conversion units 21, and the other end is electrically connected to the sources of the reverse-flow prevention switching elements 24 and the drain of the switching element 28.

The switching element 28 corresponds to an example of a semiconductor element part, and is configured as a MOSFET, for example. The drain (one end) of the switching element 28 is electrically connected between the second inductor 26 and the reverse-flow prevention switching elements 24 on the second conductive path 12, and the source (the other end) thereof is electrically connected to the reference conductive path.

One end of the capacitor 30 is connected to the second conductive path 12 on the second power supply unit 92 side of the reverse-flow prevention switching elements 24, and the other end is electrically connected to the reference conductive path.

In this configuration, the second voltage conversion unit 22 is constituted by the reverse-flow prevention switching elements 24, the second inductor 26, and the switching element 28 (semiconductor element part). This second voltage conversion unit 22 constitutes a synchronous rectification-type step up/down DC-DC convertor. The second conductive path 12 includes an output-side conductive path 12B on the first voltage conversion unit 21 side of the second voltage conversion unit 22, and includes an input-side conductive path 12A on the opposite side of the first voltage conversion unit 21. The second voltage conversion unit 22 can perform a second voltage conversion operation in which the voltage applied to the input-side conductive path 12A is lowered and the output voltage is applied to the output-side conductive path 12B.

The second drive unit 32 applies, to the gates of reverse-flow prevention switching elements 24 and the switching element 28, an ON signal (PWM signal) for alternately turning ON the reverse-flow prevention switching elements 24 and switching element 28, based on the PWM signal SG2 generated by the control unit 88. Note that the PWM signal that is output from the second drive unit 32 to the reverse-flow prevention switching elements 24 corresponds to an example of a second control signal. Hereinafter, the PWM signal output from the second drive unit 32 to the reverse-flow prevention switching element 24 is also referred to as "control signal".

Furthermore, of the plurality of reverse-flow prevention switching elements 24, the gate of some (in the first embodiment, one) of the reverse-flow prevention switching elements 24A is directly supplied with the control signal from the second drive unit 32, and another reverse-flow prevention switching element 24B is supplied with the control signal from the second drive unit 32 via the signal generation circuit 34.

The signal generation circuit 34 is provided between the second drive unit 32 and the gate of the reverse-flow prevention switching element 24B. The signal generation circuit 34 interrupts the control signal that is output from the second drive unit 32 to the reverse-flow prevention switching element 24B based on an interruption instruction signal SG3 that is output from the control unit 88.

Third conductive paths 60 are respectively provided between the second conductive path 12 and the first drive unit 50 and between the second conductive path 12 and the second drive unit 32. The third conductive paths 60 are configured such that parts thereof are arranged in parallel, one conductive path arranged in parallel is provided with a diode 62, and the other conductive path is provided with a diode 64 and a voltage generation unit 66. The anode of the diode 62 is connected to the second conductive path 12, and the cathode is connected to the first drive unit 50 and the second drive unit 32. The voltage generation unit 66 is connected to the diode 64 in series, and provided on the second power supply unit 92 side of the diode 64. The anode of the diode 64 is connected to the voltage generation unit 66, and the cathode is connected to the first drive unit 50 and the second drive unit 32. The voltage generation unit 66 is configured as a boosting circuit, for example, and can boost the voltage input from the second conductive path 12 side and output the resultant voltage to the first drive unit 50 and the second drive unit 32 side, based on a boost instruction signal SG4 from the control unit 88.

Next, the operation of the power supply device 1 will be explained.

When switching the switch unit 98 from the OFF state to the ON state to supply power from the first power supply unit 90 to the first load 94, the power supply device 1 can perform an operation for charging in advance (precharging) the capacitive component of the first load 94 using power from the second power supply unit 92 in order to prevent a large current from rapidly flowing into the capacitive component that is present in the first load 94.

Figure 3:
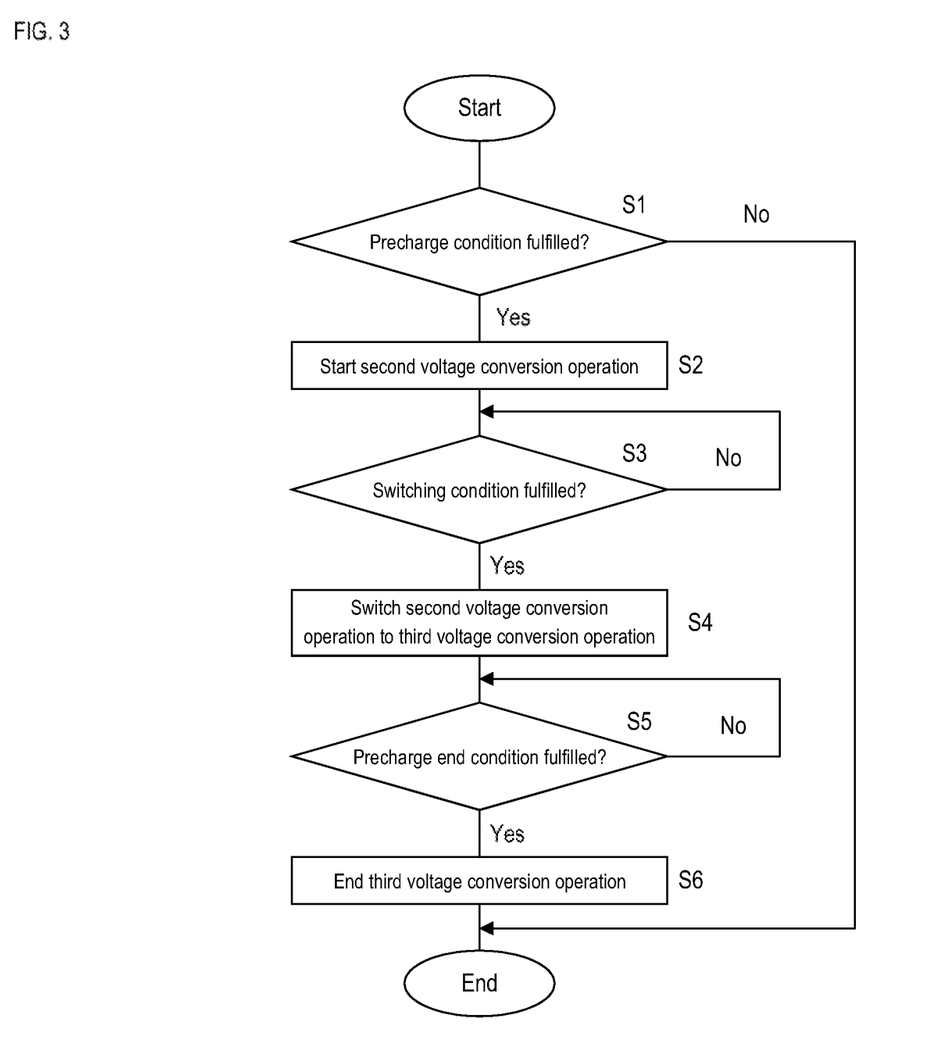
FIG. 3 is a flowchart illustrating an operational flow of precharge performed by a control unit included in the in-vehicle power supply device.

The control unit 88 is configured to repeatedly execute the precharge control shown in FIG. 3, and determines whether a predetermined precharge condition is fulfilled in accordance with the start of the precharge control in FIG. 3. The precharge condition may be that "the switch unit 98 (e.g., ignition switch) is switched from the OFF state to the ON state", for example, but may also be another predetermined condition.

Upon determining that the precharge condition is fulfilled in step S1, in step S2, the control unit 88 causes the second voltage conversion unit 22 to start the second voltage conversion operation. The second voltage conversion operation is an operation in which the second voltage conversion unit 22 lowers the voltage applied to the input side conductive path 12A of the second conductive path 12 and applies the resultant voltage to the output side conductive path 12B in accordance with the control signal supplied from the outside. Specifically, the second voltage conversion operation is realized as follows.

Upon starting the second voltage conversion operation in step S2, in step S3, the control unit 88 determines whether the switching condition has been fulfilled. Specifically, in step S3, the control unit 88 determines whether the voltage of the first conductive path 10 is greater than or equal to a predetermined threshold based on the detected value of the first voltage detection unit 80. If the voltage of the first conductive path 10 is less than or equal to the predetermined threshold, the processing moves to "No" in step S3, and if the voltage of the first conductive path 10 is greater than or equal to the predetermined threshold, the processing moves to "Yes" in step S3, and in step S4, shifts from the second voltage conversion operation to a third voltage conversion operation.

Furthermore, the control unit 88 determines the duty ratio based on the detected value of the first voltage detection unit 80 or the first current detection unit 84, and generates the PWM signal SG2 with the determined duty ratio. Thereafter, the control unit 88 outputs the PWM signal SG2 to the second drive unit 32. Upon receiving the input of this PWM signal SG2, the second drive unit 32 outputs the control signal with the duty ratio of the PWM signal SG2 to one switching element 24A of the reverse-flow prevention switching elements 24, and outputs, to the switching element 28, the PWM signal that is complementary to this control signal. In other words, a synchronous rectification-type drop operation in which the switching element 28 is turned OFF when the switching element 24A is turned ON, and the switching element 28 is turned ON when the switching element 24 is turned OFF, is executed while setting a dead time. The control signal from the second drive unit 32 is input to the signal generation circuit 34 as well. When the signal SG3 is an interruption instruction signal, the signal generation circuit 34 outputs the OFF signal to the switching elements 24B and 24C, and at this time, the switching elements 24B and 24C are brought into the OFF state. Also, when the signal SG3 is a permission signal, the signal generation circuit 34 outputs, to the switching elements 24B and 24C, a signal that is the same as the signal output to the gate of the switching element 24A from the second drive unit 32. While causing the second voltage conversion unit 22 to perform the second voltage conversion operation (during the output of the control signal to the gate of the switching element 24A), the control unit 88 sets the signal SG3 that is input to the signal generation circuit 34 to the interruption instruction signal, and thus the switching elements 24B and 24C are kept in the OFF state during the second voltage conversion unit 22 performing the second voltage conversion operation. In other words, while the second voltage conversion unit 22 performs the second voltage conversion operation, the control signal output from the second drive unit 32 is output to only the switching element 24A, and the switching elements 24B and 24C are kept in the OFF state. Accordingly, only the switching element 24A is turned ON/OFF.

In this manner, due to the PWM signal (control signal) being supplied to the switching element 24A from the second drive unit 32, the second voltage conversion unit 22 performs the second voltage conversion operation so that the voltage applied to the input-side conductive path 12A is lowered and the resultant voltage is applied to the output-side conductive path 12B. In this second voltage conversion operation, control is performed so that the feedback operation for calculating the duty ratio is repeated so that the voltage applied to the first conductive path 10 approximates a desired target voltage that is lower than the output voltage when the second power supply unit 92 is fully charged, and the voltage applied to the first conductive path 10 approximates the desired target voltage. While the second voltage conversion operation is performed in this manner, the capacitive component of the first load 94 is charged.

If it is determined that the predetermined switching condition is fulfilled in step S3, in other words, if it is determined that the voltage of the first conductive path 10 is greater than or equal to the predetermined threshold, in step S4, the control unit 88 ends the second voltage conversion operation by the second voltage conversion unit 22, and starts the third voltage conversion operation by the first voltage conversion unit 21. The third voltage conversion operation is an operation in which a synchronous rectification-type boost operation is performed in the voltage conversion device 20 by supplying an ON signal based on the PWM signal SG1 to the switching elements 40 and 42 alternately from the first drive unit 50, and the voltage applied to the second conductive path 12 is boosted and applied to the first conductive path 10.

During this third voltage conversion operation, the control unit 88 stops the output of the interruption instruction signal SG3 to the signal generation circuit 34, and outputs the ON signal to the second drive unit 32. Upon receiving the input of this ON signal, the second drive unit 32 outputs the ON signal to all the switching elements 24A, 24B, 24C . . . constituting the reverse-flow prevention switching element 24, and outputs the OFF signal to the switching element 28. Accordingly, during the third voltage conversion operation, all the switching elements 24A, 24B, 24C . . . constituting the reverse-flow prevention switching element 24 are kept in the ON state, and the switching element 28 is kept in the OFF state.

The control unit 88 determines the duty ratio based on the value detected by the first voltage detection unit 80 or the first current detection unit 84, and generates a PWM signal SG1 with the determined duty ratio. Specifically, the control unit 88 performs control so that the feedback operation for calculating the duty ratio is repeated so that the voltage applied to the first conductive path 10 approximates a desired target voltage that is higher than the output voltage when the second power supply unit 92 is fully charged, and the voltage applied to the first conductive path 10 approximates the desired target voltage. The control unit 88 outputs the thus generated PWM signal SG1 to only the first drive unit 50 corresponding to the one first voltage convention unit 21 of the plurality of first voltage conversion units 21. Upon receiving the input of this PWM signal SG1, the first drive unit 50 outputs, to the switching element 42, a control signal with the duty ratio of the PWM signal SG1, and outputs, to the switching element 40, a control signal that is complementary to this control signal (PWM signal SG1). In other words, a synchronous rectification-type control is executed so that the switching element 40 is turned OFF when the switching element 42 is turned ON, and the switching element 40 is turned ON when the switching element 42 is turned OFF, while setting a dead time. Note that the control unit 88 outputs an OFF signal to the first drive units 50 of the other first voltage conversion units 21 of the plurality of first voltage conversion units 21. Upon receiving the input of the OFF signal, the first drive units 50 keep the corresponding switching elements 40 and 42 in the OFF state.

In this manner, the third voltage conversion operation, in which the voltage applied to the second conductive path 12 is boosted and applied to the first conductive path 10, is performed. In this third voltage conversion operation, it is possible to further accumulate electric charge in the capacitive component of the first load 94 in which the electric charge has been accumulated by the second voltage conversion operation, and further increase the charge voltage of the capacitive component.

Upon starting the third voltage conversion operation in step S4, in step S5, the control unit 88 determines whether a predetermined precharge end condition is fulfilled. The predetermined precharge end condition is, for example, that "the voltage of the first conductive path 10 has exceeded a predetermined voltage", or the like.

If it is determined that the precharge end condition has not been fulfilled in step S5, the control unit 88 repeats step S5 until the precharge end condition is fulfilled. During this period, the charging of the capacitive component of the first load 94 progresses. If it is determined that the precharge end condition has been fulfilled in step S5, in step S6, the control unit 88 ends the third voltage conversion operation. In other words, the control unit 88 stops the outputs of the PWM signal SG1, the PWM signal SG2, the interruption instruction signal SG3, and the boost instruction signal SG4. Accordingly, precharging the first load 94 is complete.

Upon ending the third voltage conversion operation in step S6, the control unit 88 switches the switch unit 98 from the OFF state to the ON state, for example. In this way, it is possible to switch the switch unit 98 to the ON state in the state where the capacitive component of the first load 94 has been charged to some extent, and thus a situation where a large current flows into the capacitive component of the first load 94 is not likely to occur. Note that after switching the switch unit 98 to the ON state in accordance with step S6, the control unit 88 may function so that the voltage conversion device 20 performs the above-described voltage drop operation to lower the voltage applied to the first conductive path 10 and apply the desired output voltage to the second conductive path.

Note that in this configuration, the control unit 88 outputs the boost instruction signal SG4 to the voltage generation unit 66 during the first voltage conversion operation, the second voltage conversion operation, or the third voltage conversion operation. During the period in which this boost instruction signal SG4 is supplied, the voltage generation unit 66 boosts the input voltage (voltage applied to the second conductive path 12) and outputs the resultant voltage to the anode side of the diode 64. Note that the control unit 88 may also output the boost instruction signal SG4 in any or all of the periods, namely, during the first voltage conversion operation, the second voltage conversion operation, and the third voltage conversion operation. The control unit 88 may also output the boost instruction signal SG4 only when the voltage applied to the second conductive path 12 is less than or equal to a predetermined value.

Next, the effects of the power supply device 1 will be illustrated.

In the above-described power supply device 1, the second voltage conversion unit 22 is constituted by including the reverse-flow prevention switching elements 24, the second inductor 26, and the switching element 28 (semiconductor element part). This second voltage conversion unit 22 performs the second voltage conversion operation in which the voltage applied to the input-side conductive path 12A is lowered and the output voltage is applied to the output-side conductive path 12B, using, of the second conductive path 12, the first voltage conversion unit 21 side of the second voltage conversion unit 22 as the output-side conductive path 12B and the opposite side to the first voltage conversion unit 21 as the input-side conductive path 12A. Furthermore, the reverse-flow prevention switching element 24 is configured such that the plurality of semiconductor switching elements 24A, 24B, 24C, . . . and so on are connected in parallel with each other, and the control unit 88 causes the second voltage conversion unit 22 to perform the second voltage conversion operation by supplying the second control signal for switching the ON signal and the OFF signal alternately to only some of the plurality of semiconductor switching elements 24A, 24B, 24C, . . . and so on constituting the reverse-flow prevention switching element 24 in accordance with the predetermined precharge condition being fulfilled.

In this manner, the power supply device 1 can cause the second voltage conversion unit 22 to perform the second voltage conversion operation in accordance with a predetermined precharge condition being fulfilled. Accordingly, if it is possible to switch the switch unit 98 from the OFF state to the ON state at least after performing the second voltage conversion operation in this manner, the switch unit 98 is switched from the OFF state to the ON state in a state where charging of the capacitive component has progressed to some extent. As a result, it is possible to suppress the inrush current that flows into the capacitive component from the first power supply unit 90 immediately after the switching.

Furthermore, with this configuration, when the control unit 88 causes the second voltage conversion unit 22 to perform the second voltage conversion operation in accordance with a predetermined precharge condition being fulfilled, only some of the semiconductor switching elements 24A, 24B, 24C, . . . and so on constituting the reverse-flow prevention switching element 24 are supplied with the second control signal. Accordingly, it is possible to suppress the power that is required for the control unit 88 to drive the reverse-flow prevention switching elements 24 in accordance with the second voltage conversion operation. Accordingly, even if the voltage of the power supply that supplies power to the control unit 88 drops, a situation where the control unit 88 cannot perform the control of the precharge operation (control of the second voltage conversion operation) is not likely to occur.

Furthermore, the power supply device 1 is provided with the plurality of third conductive paths 60 that serve as the power supply path from the second conductive path 12 to the control unit 88. The plurality of third conductive paths 60 are connected in parallel with each other between the second conductive path 12 and the control unit 88, and one of the third conductive paths 60 is provided with the voltage generation unit 66 that boosts the voltage applied to the conductive path on the second conductive path 12 side and applies the output voltage to the conductive path on the control unit 88 side. With this configuration, even if the voltage applied to the second conductive path 12 is small, the voltage generation unit 66 can boost the voltage applied to the conductive path on the second conductive path 12 side and apply the output voltage to the conductive path on the control unit 88 side. Accordingly, even if the voltage applied to the second conductive path 12 is small, the drive voltage required for the operation of the control unit 88 is likely to be ensured.

Furthermore, the control unit 88 causes the second voltage conversion unit 22 to perform the second voltage conversion operation by supplying the second control signal to only one of the plurality of semiconductor switching elements 24A, 24B, 24C, . . . constituting the reverse-flow prevention switching element 24 in accordance with the predetermined precharge condition being fulfilled. With this configuration, since the number of the driving semiconductor switching elements can be minimized when performing the second voltage conversion operation, power consumption during the second voltage conversion operation can be further reduced.

Furthermore, in the power supply device 1, the semiconductor element part is the switching element 28. For this reason, for example, when a current smaller than the critical current of the second inductor 26 or the first inductor 44 flows, by turning ON the switching element 28, an inverse current (hereinafter also referred to as "reverse current") generated in the second inductor 26 or the first inductor 44 can flow into the reference conductive path without being accumulated in the switching element 28. Accordingly, when performing the second voltage conversion operation, the reverse current is prevented from being added to the output from the reverse-flow prevention switching element 24, and thus a case where the width (duty ratio) of the output of the reverse-flow prevention switching element 24 unintentionally changes due to the reverse current can be suppressed.

Furthermore, the control unit 88 turns ON the drive switching element 40 in the period in which the control unit 88 causes the second voltage conversion unit 22 to perform the second voltage conversion operation. In this manner, it is possible to further suppress a voltage drop that occurs in the drive switching element 40 during the second voltage conversion operation.

For example, as shown in FIG. 2, if a FET is used as the switching element 40, and the switching element 40 (FET) is turned OFF and a current is caused to flow from the second conductive path 12 side toward the first conductive path 10 using only the body diode of the FET as the energizing path during the second voltage conversion operation, there is a concern that a loss occurs in this body diode. However, if the drive switching element 40 is turned ON in the period in which the second voltage conversion unit 22 is caused to perform the second voltage conversion operation, such a loss can be reliably avoided. Note that the switching element 42 may be kept in the OFF state during the second voltage conversion operation.

Other Embodiments

The present disclosure is not limited to the embodiment illustrated based on the above descriptions and the drawings, and the following embodiments are also included in the technical scope of the present disclosure.

In the first embodiment, the control signal is output to only one of the reverse-flow prevention switching elements 24 in the second voltage conversion operation, but a configuration is also possible where the control signal is output to two or more reverse-flow prevention switching elements 24 as long as it is only a part of the reverse-flow prevention switching elements 24.

In the first embodiment, the first power supply unit 90 (first load 94) side is the high-voltage side and the second power supply unit 92 (second load 96) side is the low-voltage side, but a configuration is also possible in which the first power supply unit 90 (first load 94) side is the low-voltage side and the second power supply unit 92 (second load 96) side is the high-voltage side. In other words, the present disclosure can also be applied to a configuration in which the precharge is performed on the low-voltage side capacitive component.

In the first embodiment, the voltage generation unit 66 is provided on the third conductive path 60, but the voltage generation unit 66 may also be omitted.

In the first embodiment, in the third voltage conversion operation, the control signal is output to the switching element 40 of one of the plurality of first voltage conversion units 21, but the control signal may also be output to the switching elements 40 of two or more of the first voltage conversion units 21 as long as it is the switching elements 40 of only a part of the first voltage conversion units 21.

Although the semiconductor element part is the switching element in the first embodiment, the semiconductor element part may also be a diode. If the semiconductor element part is a diode, a configuration is possible in which the anode is electrically connected to the reference conductive path, the cathode is electrically connected between the second inductor 26 and the reverse-flow prevention switching element 24 on the second conductive path 12, and the second voltage conversion unit 22 functions as a diode-type DC-DC convertor.

The invention claimed is:

1. An in-vehicle power supply device configured to lower a voltage applied to a first conductive path and apply the resultant voltage to a second conductive path, or boost a voltage applied to the second conductive path and apply the resultant voltage to the first conductive path, the in-vehicle power supply device being provided in an in-vehicle power supply system that is configured such that power from a first power supply unit is supplied via the first conductive path, power from a second power supply unit is supplied via the second conductive path, a capacitive component is electrically connected to the first conductive path, and a switch unit that switches between an ON state where a flow of current from the first power supply unit to the capacitive component side is allowed and an OFF state where that flow of current is interrupted is provided between the first power supply unit and the capacitive component, and the in-vehicle power supply device comprising:

a first voltage conversion unit that includes a first inductor and a drive switching element that is turned ON/OFF in accordance with a first control signal that is supplied to the drive switching element, the first control signal alternately switching between an ON signal and an OFF signal, the first voltage control unit performing a first voltage conversion operation in which a voltage applied to the first conductive path is lowered by the ON/OFF operation of the drive switching unit and applied to the second conductive path;

a reverse-flow prevention switching element that is provided on the second conductive path and that interrupts a flow of a current on the second conductive path toward the first voltage conversion unit when turned OFF;

a second inductor that is provided between the first voltage conversion unit and the reverse-flow prevention switching element on the second conductive path, and in series with respect to the reverse-flow prevention switching element;

a semiconductor element part constituted by a diode or a switching element that has one end electrically connected to the second inductor and the reverse-flow prevention switching element on the second conductive path and another end electrically connected to a reference conductive path; and a control unit that outputs the first control signal to at least the drive switching element, wherein a second voltage conversion unit is configured by including the reverse-flow prevention switching element, the second inductor, and the semiconductor element part, and, when a part of the second conductive path that is on the first voltage conversion unit side of the second voltage conversion unit is regarded as an output-side conductive path, and a part of the second conductive path that is on the side opposite to the first voltage conversion unit side is regarded as an input-side conductive-path, the second voltage conversion unit performs the second voltage conversion operation in which the voltage applied to the input-side conductive path is lowered, and an output voltage is applied to the output-side conductive path, the reverse-flow prevention switching element is configured such that a plurality of semiconductor switching elements are connected in parallel with each other, and the control unit causes the second voltage conversion unit to perform the second voltage conversion operation by supplying a second control signal by which an ON signal and OFF signal are alternately switched to only some of the plurality of semiconductor switching elements constituting the reverse-flow prevention switching element in accordance with a predetermined precharge condition being fulfilled.

2. The in-vehicle power supply device according to claim 1, comprising:

a plurality of third conductive paths that serve as a power supply path from the second conductive path to the control unit, wherein the plurality of third conductive paths are connected in parallel with each other between the second conductive path and the control unit, and a voltage generation unit that boosts a voltage applied to the conductive path on the second conductive path side and applies the output voltage to the conductive path on the control unit side is provided on one of the third conductive paths.

3. The in-vehicle power supply device according to claim 1, wherein the control unit, in accordance with the predetermined precharge condition being fulfilled, supplies the second control signal to only one of the plurality of semiconductor switching elements constituting the reverse-flow prevention switching element, and causes the second voltage conversion unit to perform a second voltage conversion operation.

4. The in-vehicle power supply device according to claim 1, wherein the semiconductor element part is a switching element.

5. The in-vehicle power supply device according to claim 1, wherein the control unit turns ON the drive switching element in the period in which the control unit causes the second voltage conversion unit to perform the second voltage conversion operation.

6. The in-vehicle power supply device according to claim 2, wherein the control unit, in accordance with the predetermined precharge condition being fulfilled, supplies the second control signal to only one of the plurality of semiconductor switching elements constituting the reverse-flow prevention switching element, and causes the second voltage conversion unit to perform a second voltage conversion operation.

7. The in-vehicle power supply device according to claim 2, wherein the semiconductor element part is a switching element.

8. The in-vehicle power supply device according to claim 3, wherein the semiconductor element part is a switching element.

9. The in-vehicle power supply device according to claim 2, wherein the control unit turns ON the drive switching element in the period in which the control unit causes the second voltage conversion unit to perform the second voltage conversion operation.

10. The in-vehicle power supply device according to claim 3, wherein the control unit turns ON the drive switching element in the period in which the control unit causes the second voltage conversion unit to perform the second voltage conversion operation.

11. The in-vehicle power supply device according to claim 4, wherein the control unit turns ON the drive switching element in the period in which the control unit causes the second voltage conversion unit to perform the second voltage conversion operation.

* * * * *